United States Patent
Searer et al.

(10) Patent No.: US 9,610,924 B1
(45) Date of Patent: Apr. 4, 2017

(54) METHOD AND APPARATUS FOR WHEEL OR TIRE CHOCKS FOR RECREATIONAL VEHICLES AND TRAILERS

(71) Applicants: Craig A Searer, Elkhart, IN (US); Randal J Clay, Elkhart, IN (US); David W Busch, South Bend, IN (US)

(72) Inventors: Craig A Searer, Elkhart, IN (US); Randal J Clay, Elkhart, IN (US); David W Busch, South Bend, IN (US)

( * ) Notice: Subject to any disclaimer, the term of this patent is extended or adjusted under 35 U.S.C. 154(b) by 0 days.

(21) Appl. No.: 14/704,903

(22) Filed: May 5, 2015

Related U.S. Application Data

(60) Provisional application No. 61/988,444, filed on May 5, 2014.

(51) Int. Cl.
*B60T 3/00* (2006.01)
*B60T 1/04* (2006.01)

(52) U.S. Cl.
CPC . *B60T 3/00* (2013.01); *B60T 1/04* (2013.01)

(58) Field of Classification Search
CPC .............. B60T 1/04; B60T 3/00; B66F 7/065
USPC ........................ 188/2 R, 32, 36, 74; D12/217
See application file for complete search history.

(56) References Cited

U.S. PATENT DOCUMENTS

| | | | | |
|---|---|---|---|---|
| 433,413 A | * | 7/1890 | Lawrence | B60T 13/44 188/54 |
| 4,715,480 A | * | 12/1987 | Anderson | B60T 3/00 188/2 R |
| 4,934,489 A | * | 6/1990 | Jackson | B60T 1/04 188/2 R |
| D347,821 S | * | 6/1994 | Few | D12/217 |
| 5,392,880 A | * | 2/1995 | Christian | B60T 3/00 188/2 R |
| 6,425,465 B1 | * | 7/2002 | Tallman | B60P 3/075 188/32 |
| D535,176 S | * | 1/2007 | Joiner | D8/330 |
| 8,365,875 B2 | * | 2/2013 | Garceau | B60P 3/077 188/32 |

* cited by examiner

*Primary Examiner* — Thomas J Williams
(74) *Attorney, Agent, or Firm* — Rick B. Yeager

(57) ABSTRACT

A tire chock with improved ease of use and prevention of theft. A threaded rod expands a scissor frame to force foot plates against a tire. The scissor frame foot plates are pulled apart or pushed together so that the frame fits between the tires. A hand-adjustable, freely rotatable nut is on the lower end of the rod is tightened. A wrench is used to tighten a second nut on the upper end of the rod, and a lock member is secured over the second nut.

10 Claims, 11 Drawing Sheets

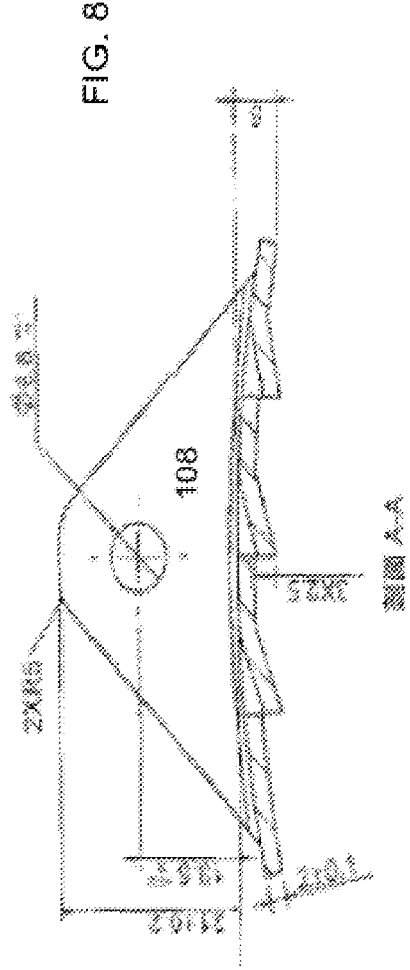

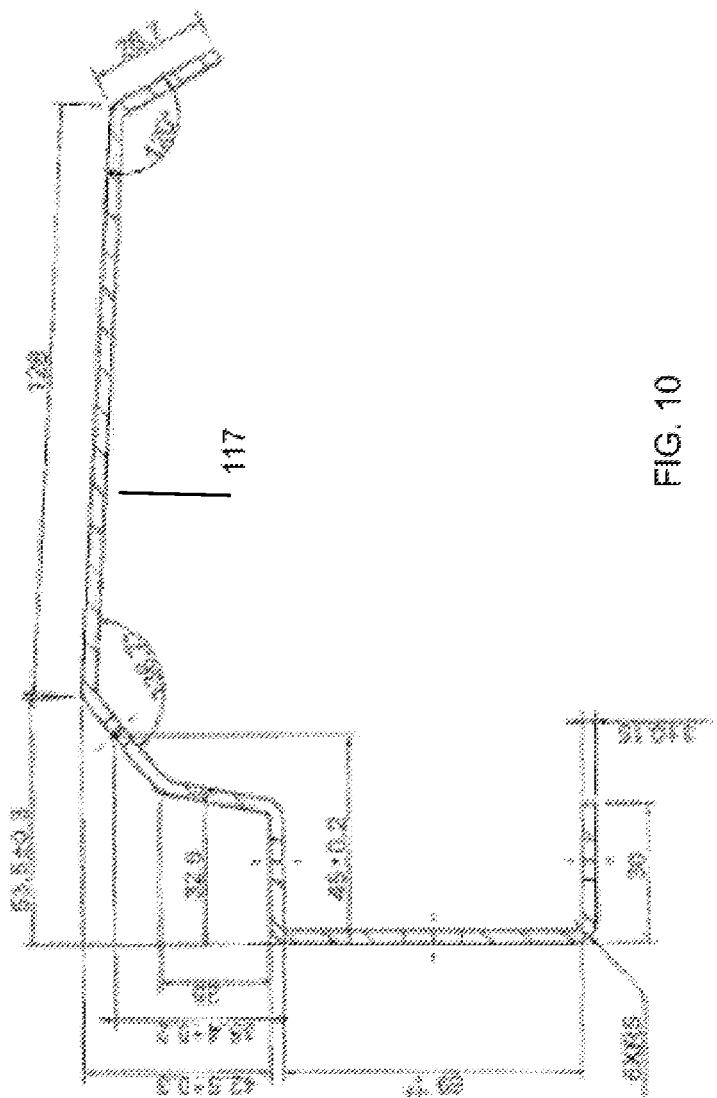

METHOD AND APPARATUS FOR WHEEL OR TIRE CHOCKS FOR RECREATIONAL VEHICLES AND TRAILERS

RELATED APPLICATIONS

This non-provisional patent application is related to U.S. Provisional Patent Application No. 61/988,444 filed May 5, 2014 by applicants, and claims the benefit of that application.

BACKGROUND

Field of Invention

The present application relates to wheel or tire chocks that are lockable in an engaged position to prevent theft, and chocks that have improved methods to quickly adjust the engagement position.

Prior Art

Wheel or tire chocks are used to prevent a trailer or vehicle from moving back and forth when at rest. Tire chocks are placed between the wheels and expanded to apply pressure to both wheels in opposite directions, therefore preventing them from moving or rocking.

One problem with current tire chocks is that is takes time to make the adjustment to apply pressure to the tires. Another problem is that they are easily stolen, as the tire chock can be removed by someone with the correct size wrench.

There is a need for an improved tire chock that addresses the problems of adjustability and theft.

U.S. Pat. No. 8,365,875 to Garceau describes a tire chock having an at least partially threaded rod; a first trunnion having an aperture therethrough that receives the rod; first and second locking members, one locking member being rotatably fixed relative to the rod, the other locking member being rotatably fixed relative to the first trunnion. A tire chock may alternatively have an at least partially threaded rod; an upper trunnion rotatably attached to the rod; a lower trunnion threadedly attached to the rod, the lower trunnion translating axially relative to the rod upon rotation of the rod relative to the lower trunnion; a pair of linkage arms, the pair of linkage arms forming an X-shape, each linkage arm being connected to the lower trunnion by a drive arm and being connected to the upper trunnion by a support arm, wherein, as the rod is rotated relative to the lower trunnion, the linkage arms expand or contract.

FIGS. 1A and 1B show two embodiments described in the '875 patent. The device is expanded into position by turning nut 32 or 132. The device may be locked by aligning apertures:

"As illustrated in FIGS. 9-10, lower locking member 128 and upper locking member 130 may comprise a plurality of apertures 136, 138 therethrough. Since lower locking member 128 may be fixed relative to upper trunnion 124 and handle 134; and upper washer 130 may be fixed relative to threaded rod 120 and nut 132, tire chock 110 is able to be locked in any position by aligning aperture 136 in lower locking member 128 with aperture 138 in upper locking member 130 and inserting a lock or pin through both apertures 136, 138."

Adjusting the width of the '875 device is relatively slow because the threaded rod must be rotated with respect to a lower trunnion:

"Lower trunnion 22 may be threadedly connected to threaded rod 20 such that as the threaded rod 20 is rotated relative to lower trunnion 22, the trunnion 22 translates axially relative to the threaded rod 20. Tire chock 10 may additionally comprise upper trunnion 24 that is rotatably connected to the threaded bar 20."

As described below, one aspect of the current invention is to permit a scissor frame to be quickly set to an approximate desired position without requiring the threaded rod to be turned. In the embodiments described below, a freely rotatable nut is used to set an expansion limit of the device which is just narrower than the final locked width of the device. A top head or nut is then turned, or a cam is engaged, to provide the final adjustment to lock the chock in place.

SUMMARY OF INVENTION

The current invention provides for improved devices and methods of ease of adjustment and prevention of theft.

In one embodiment, a threaded rod is used to secure a scissor frame in an expanded position. The scissor frame is attached to a plurality of foot plates which compressively and frictionally engage tires or wheels, thereby preventing the tires or wheels from rotating. A freely rotatable nut is provided on a first (typically lower) end of the threaded rod such that the nut may be quickly adjusted by hand. The scissor frame is pulled apart or pushed together so that it is sized to fit between the tires or wheels. The freely rotatable nut is then tightened by hand until it engages a lower support arch. The scissor frame is then positioned between the tires or wheels.

The lower support arch provides a socket for the nut so that a final tightening from the second (typically upper) end of the threaded rod tightens the freely rotatable nut with respect to the lower support arch. The lower support arch thus eliminates the need for a wrench to hold the freely rotatable nut, and it provides a security feature by preventing the unauthorized loosening of the freely rotatable nut and theft of the chock. A ratchet wrench may be provided to fit a head or nut of the second end of the threaded rod so that the final tightening of the scissor frame is easily and quickly accomplished. A standard ratchet wrench and socket, or a standard wrench may also be used. A lock member cover is pivotally attached to the scissor frame so that it can be pivoted to cover the head of the threaded rod and locked into position to prevent the unauthorized removal of the chock.

An upper support arch is rotatably attached to the threaded rod such that it adds compressive strength to a handle bracket while the chock is expanding between the two tires. A handle is provided on the scissor frame so that the frame can be held while the freely rotatable nut on the first end of a threaded rod is set to a desired position to provide an expansion limit of the chock. Once the chock is expanded to approximately the desired expansion width, the chock is placed in between the two tires for the final adjustment to securely hold the chock in place. This final adjustment is accomplished from the second end of the threaded rod while the lower support arch holds the adjustable nut firmly and prevents the nut from rotating. The final expansion of the chock is accomplished by the second trunnion that is formed in a "u" shape.

In another embodiment, a threaded rod, freely rotatable nut, and lower support arch are provided as described above. A cam mechanism is provided on the second end of the threaded rod so that the final tightening of the scissor frame is accomplished by pushing a cam arm into a locked position, thereby tightening a cam mechanism against the threaded rod. The cam handle is then locked to the chock handle to prevent theft.

DESCRIPTION OF FIGURES

FIG. 8 is a side view of a foot member of the chock of FIG. 7.

FIG. 9 is a side view of the cam handle of the chock of FIG. 7.

FIG. 10 is a side view of the device handle of the chock of FIG. 7.

DETAILED DESCRIPTION OF EMBODIMENT

Tire Chock with Ratchet Mechanism

Figure 13:
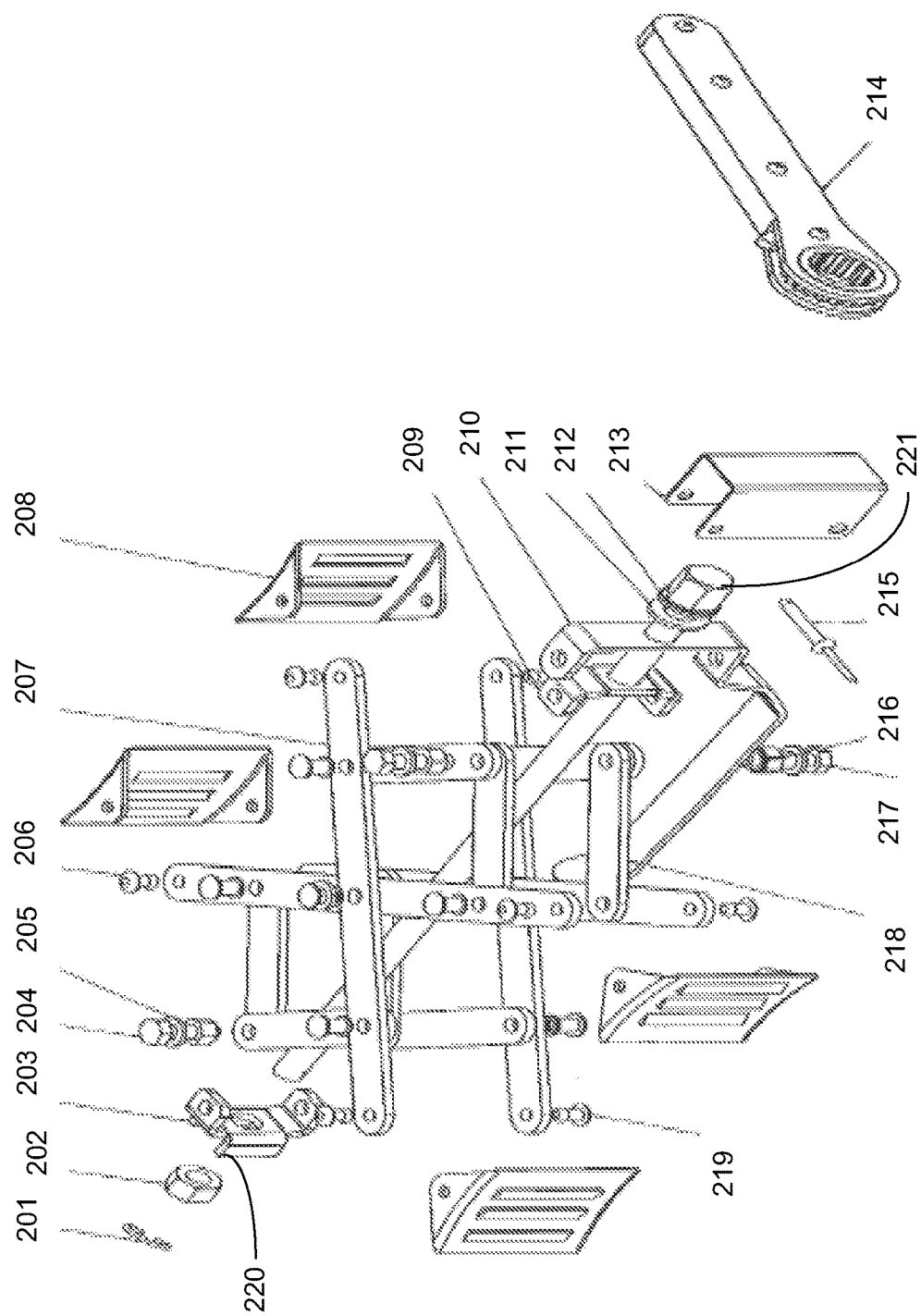
FIG. 13 is an exploded view of a ratchet embodiment of a chock.

FIG. 13 is an exploded perspective side view of ratchet style chock 200 showing a clip 201; a freely adjustable bottom nut 202; a distal or bottom support arch 203; a threaded rod 212 (lead screw); a proximal or top support arch 209; handle 210; washer 211; and locking member cover 213.

A scissor frame comprises long supports 207; short supports 218; bolts 204 and 217, washers 205, and nuts 216; rivets 206, 215, and 219. The scissor frame adjustably supports foot plates 208. As the scissor frame is expanded, it pushes the support foot plates against the tires or wheels.

The foot plates may be pulled outwardly to expand the scissor frame to a width slightly smaller than the spacing between tires. Freely adjustable bottom nut 202 is hand tightened to set an expansion limit for the desired insertion width of the scissor frame. As the scissor frame is expanded, the bottom support arch 203 is pushed against nut 202 so that nut socket 220 engages the nut.

The chock is held in the desired position with handle 210 while ratchet wrench 214 is used to tighten the head 221 of threaded rod 212. As the head is turned, the threaded rod is tightened into nut 202 to hold the scissor frame in the desired expanded orientation.

Locking Member Cover Plate

Figure 1B:
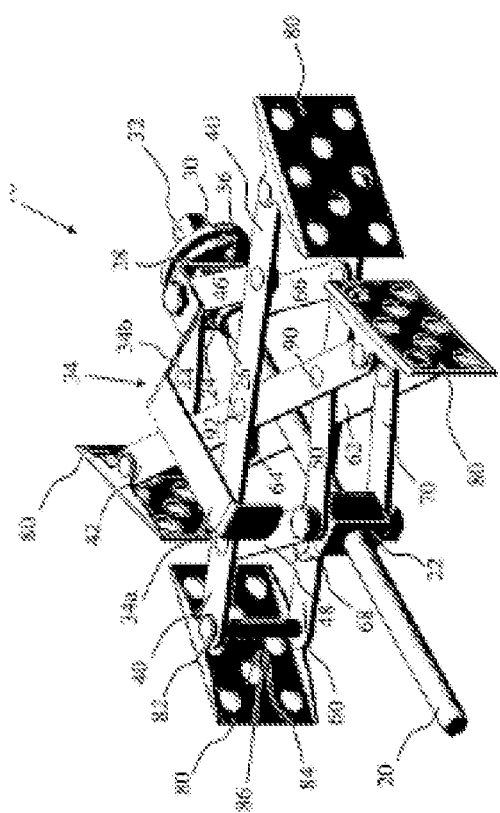
FIGS. 1A and 1B are perspective views of prior art devices described in U.S. Pat. No. 8,365,875.
Figure 1A:
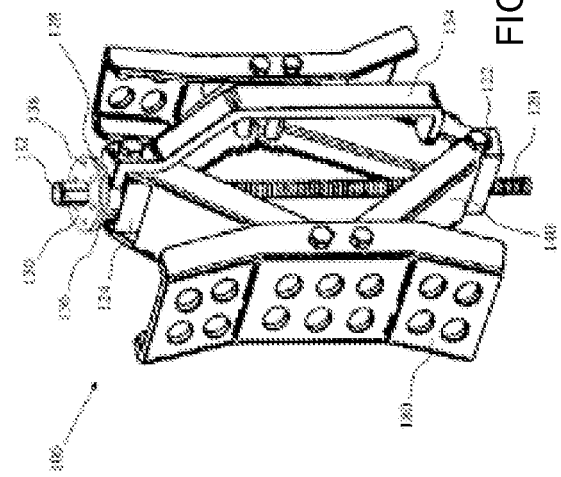
Figure 2:
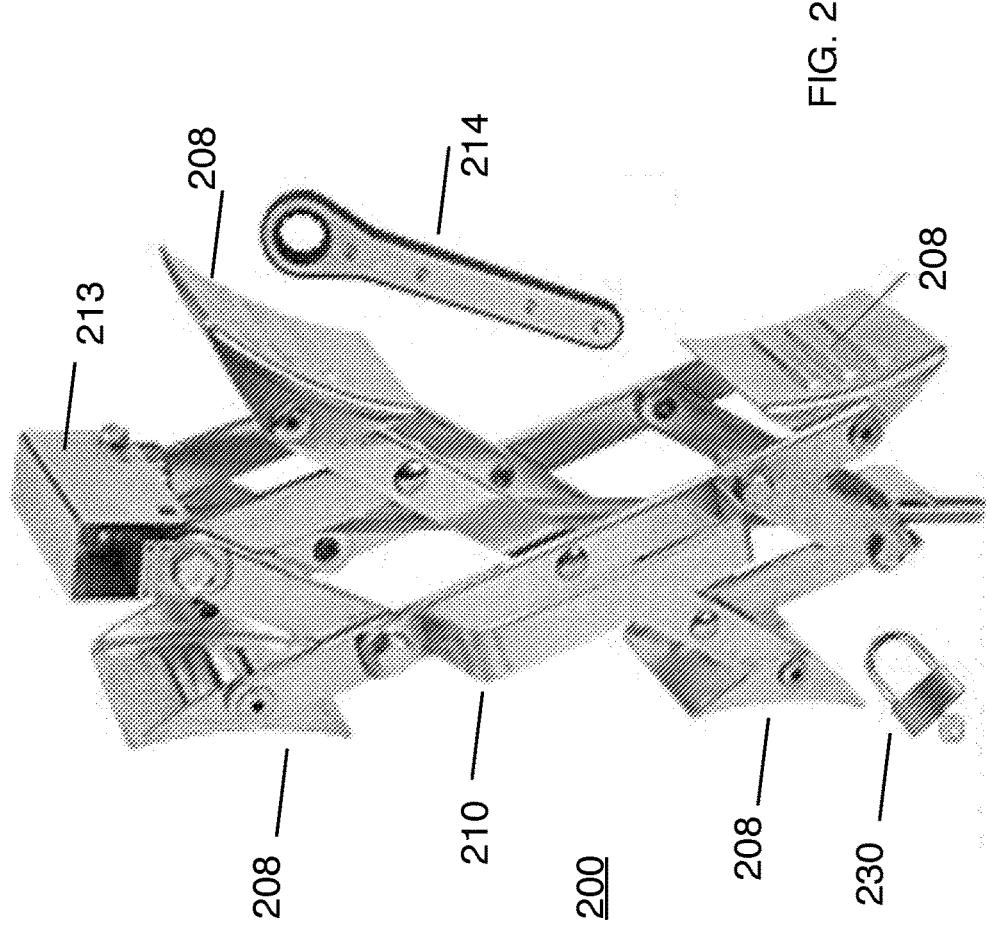
FIG. 2 is a front perspective view of a chock with a locking member cover plate in a closed position to cover a top head or nut.
Figure 3:
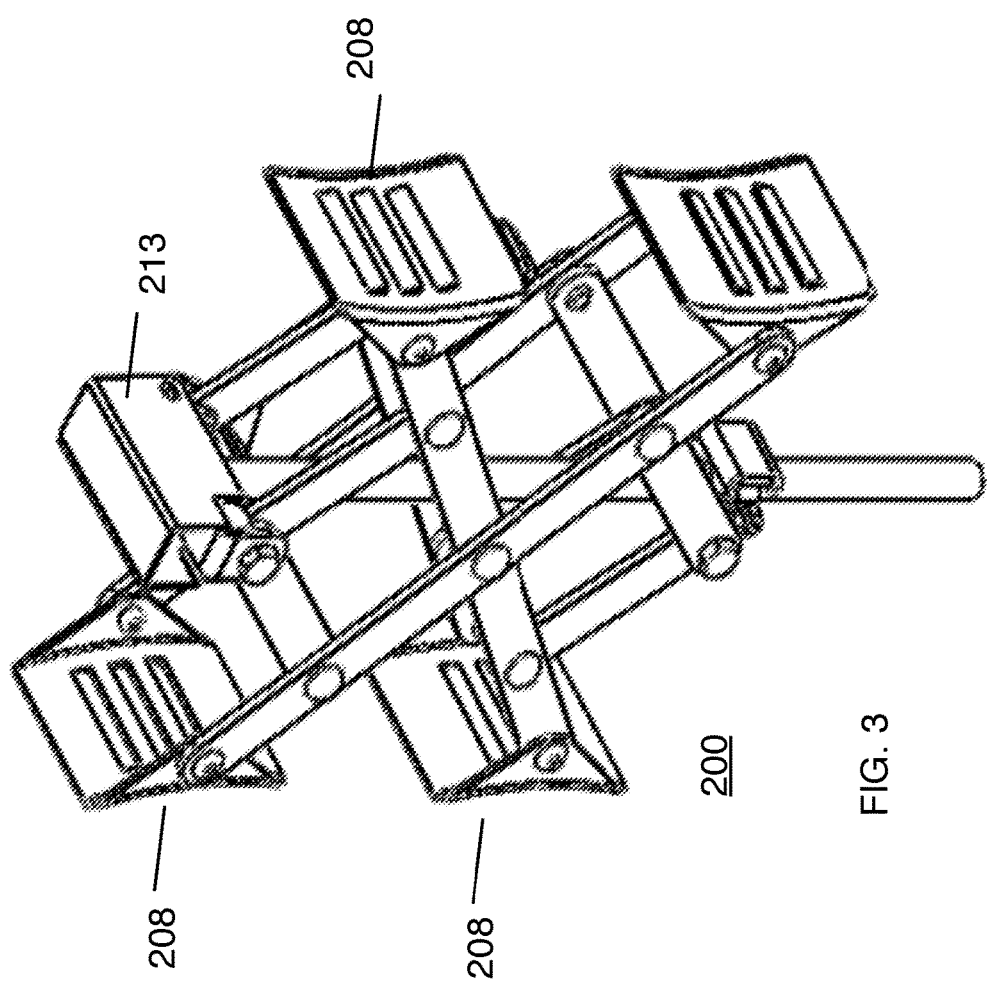
FIG. 3 is a rear perspective view of the chock of FIG. 2.

FIG. 2 is a front perspective view of chock 200 with a locking member cover plate 213 closed into position to cover threaded rod head 221 (not shown). FIG. 3 is a rear perspective view of the chock 200 showing pivot rivet 215 so that the cover plate may be locked to handle 210.

Figure 4:
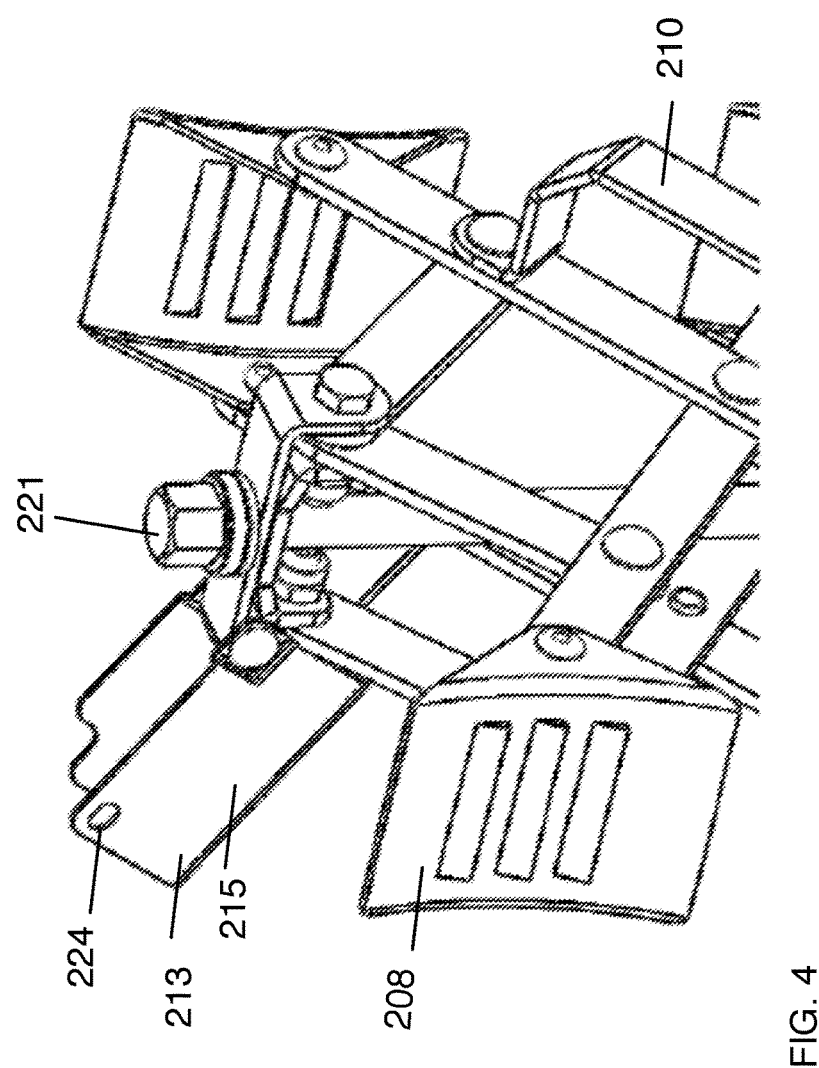
FIG. 4 is a first side perspective view detail of the chock of FIG. 2 with a locking member cover plate open to provide access to a top head or nut.
Figure 5:
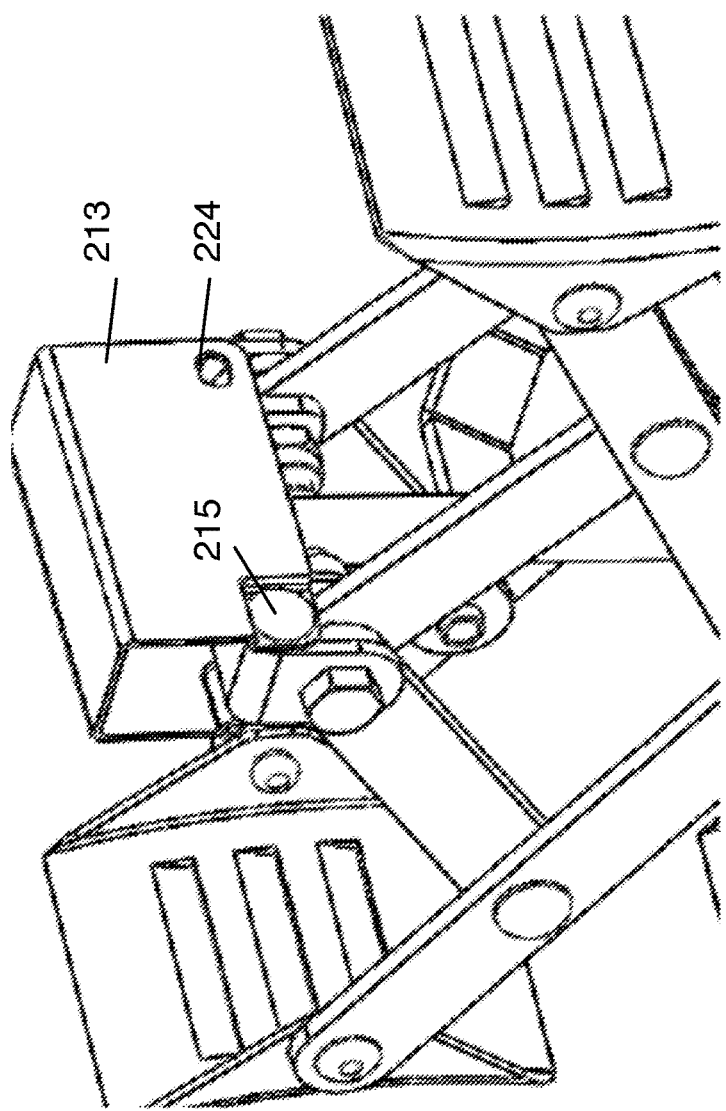
FIG. 5 is a detailed second side perspective view of the locking member cover plate of FIG. 2 in a closed position.
Figure 6:
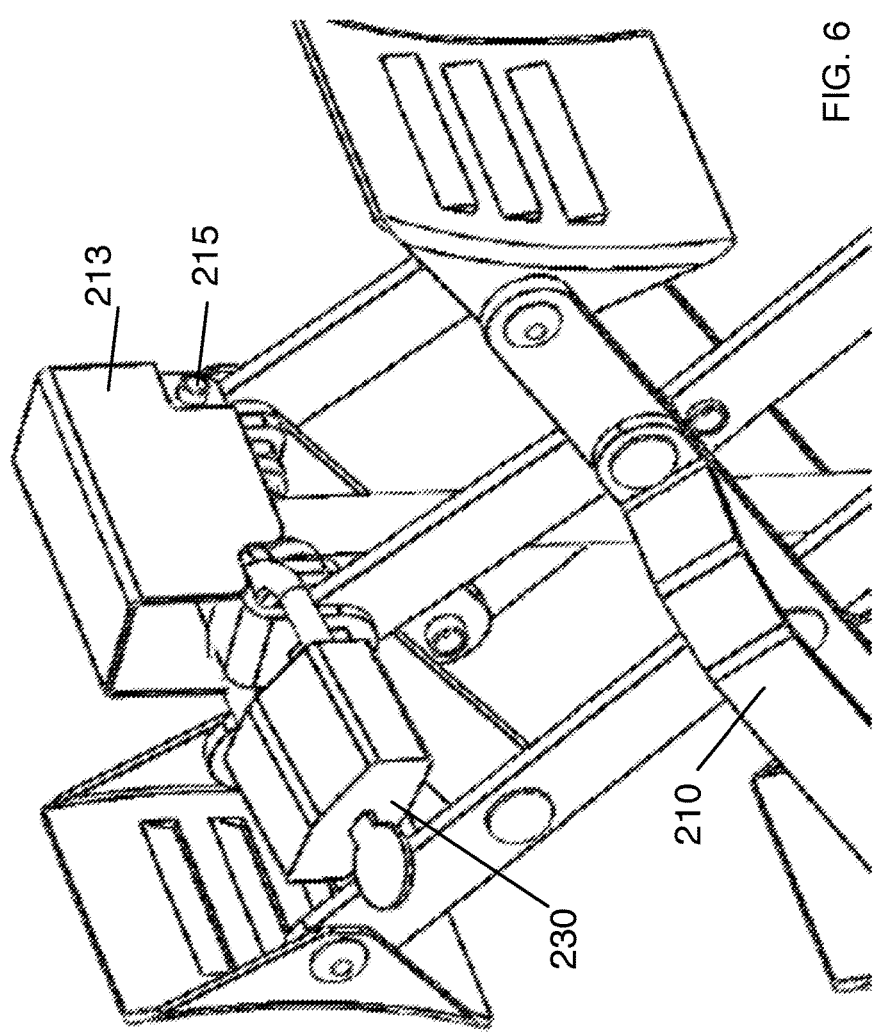
FIG. 6 is a detailed first side perspective view of the locking member cover plate of FIG. 2 in a closed position with a lock installed.

FIG. 4 is a first side perspective view detail of the chock 200 of FIG. 2 with locking member cover plate 213 open to provide access to threaded rod top head 221. In this example, the lock may be inserted through lock hole 224 so that a portion of the lock is positioned in the gap 240 between handle 210 and top support arch 209. FIG. 5 is a detailed second side perspective view of the locking member cover plate 213 in a closed orientation. FIG. 6 is a detailed first side perspective view of the locking member cover plate 213 with pivot rivet 215 and lock 230 inserted into lock hole 224.

DETAILED DESCRIPTION OF EMBODIMENT

Tire Chock with Cam Handle

Figure 7:
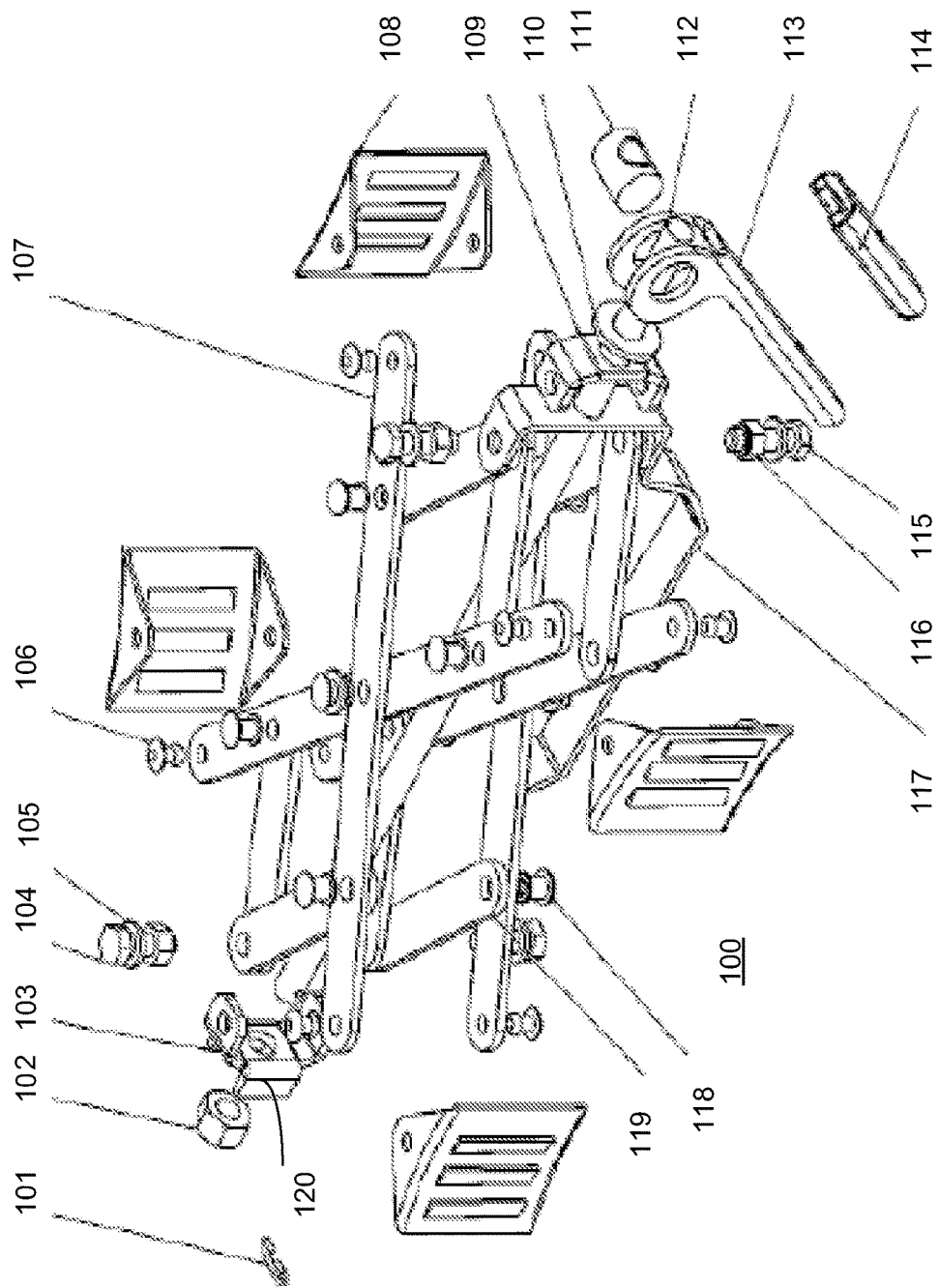
FIG. 7 is an exploded view of a cam embodiment of a chock.

FIG. 7 is an exploded perspective side view of cam style chock 100 showing a clip 101; bottom nut 102; a distal or bottom support arch 103; a threaded rod 112 (lead screw); a proximal or top support arch 109; handle 117; washer 110; cam handle 113, and locking member cover 114.

A scissor frame comprises long supports 107; short supports 119; bolts 104 and 115, washers 105, and nuts 116; rivets 106 and 118. The scissor frame adjustably support foot plates 108. As the scissor frame is expanded, it pushes the support foot plates against the tires.

The foot plates may be pulled outwardly to expand the scissor frame to a width slightly smaller than the spacing between tires. Freely adjustable bottom nut 102 is hand tightened to set an expansion limit for the desired insertion width of the scissor frame. As the scissor frame is expanded, the bottom support arch 103 is pushed against nut 102 so that nut socket 120 engages the nut.

The chock is held in the desired position with handle 117 while cam lever 113 is used to tighten the threaded rod 112. As the cam lever 113 is depressed, cam shaft 111 urges top support arch 109 toward the bottom nut 102. A rubber handle cover 114 may be provided for the cam lever.

A lock hole is provided on cam lever 113 and cover 114 so that a lock may be inserted through the cam lever lock hole and a hole in handle 117 to secure cam lever 113 to handle 117.

FIG. 8 is a side view of a foot member 108 of the chock 100.

FIG. 9 is a side view of the cam handle 113 of the chock 100.

FIG. 10 is a side view of the device handle 117 of the chock 100.

Figure 11:
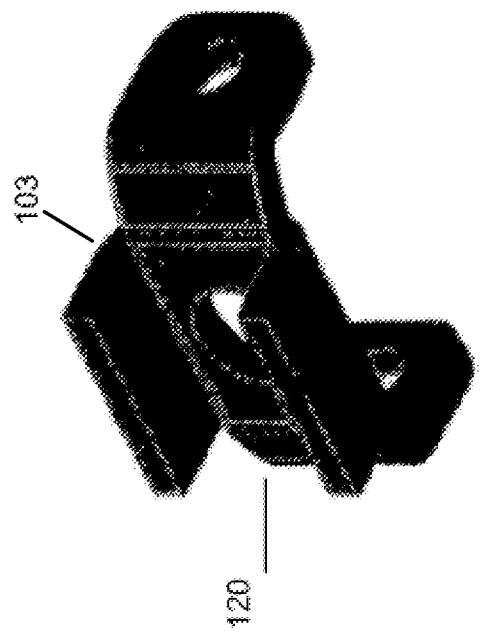
FIG. 11 is a side perspective view of the lower support arch of the chock of FIG. 7.

FIG. 11 is a side perspective view of the lower support arch 103 of the chock of 100 showing nut socket 120.

Figure 12:
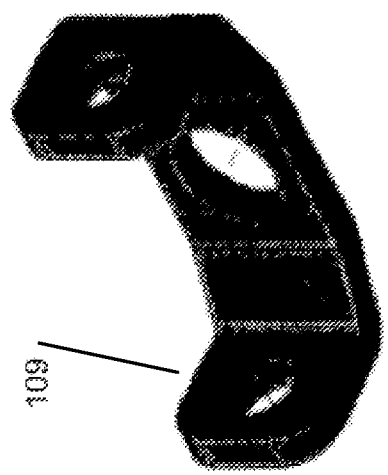
FIG. 12 is a side perspective view of the upper support arch of the chock of FIG. 7.

FIG. 12 is a side perspective view of the upper support arch 109 of the chock of 100.

It is to be understood that the specific embodiments and examples described above are by way of illustration, and not limitation. Various modifications may be made by one of ordinary skill, and the scope of the invention is as defined in the appended claims.

What is claimed is:
1. A tire chock, comprising:
   a scissor frame with a central axis, the scissor frame comprising
      a proximal support arch,
      a distal support arch with a nut socket,
      a plurality of frame members connected to the distal support arch and the proximal support arch, and a plurality of foot supports supported by the frame members and configured to engage tires or wheels, such that the proximal support arch and distal support arch are drawn closer together as the foot members are forced outwardly with respect to the central axis, and the proximal support arch and distal support arch are pushed further apart as the foot members are forced inwardly toward the central axis;

a rod positioned along the central axis of the scissor frame, the rod comprising a distal end portion and a proximal end portion;

a freely rotatable nut attached to distal end portion of the rod; and a final tightening element provided on the proximal end portion of the rod.

2. The tire chock of claim 1 further comprising a final tightening element lock member.

3. The tire chock of claim 2 wherein the proximal end of the threaded rod comprises a top head;

the final tightening element is the top head; and the final tightening element lock member is a pivotal cover plate having an open orientation to expose the top head of the threaded rod, and a closed orientation to conceal the top head of the threaded rod.

4. The tire chock of claim 2 wherein the final tightening element is a cam mechanism comprising a cam handle and a cam shaft; and the final tightening element lock member is lock which secures the cam handle.

5. A method of rapidly adjusting a tire chock, the method comprising providing a tire chock comprising a scissor frame comprising a proximal support arch, and a distal support arch with a nut socket, a rod positioned along a central axis of the scissor frame, the rod comprising a distal end portion and a proximal end portion, a freely rotatable nut attached to distal end portion of the rod, and a final tightening element provided on the proximal end portion;

turning the freely rotatable nut until it is at a desired position on the rod, such that when the distal support arch is pressed against the nut the scissor frame has a desired width;

positioning the scissor frame between two tires or wheels; and engaging the final tightening element to expand the scissor frame.

6. The method of claim 5 further comprising locking the final tightening element.

7. The method of claim 5 wherein engaging the final tightening element to expand the scissor frame further comprises using a ratchet handle to turn a head or nut on the proximal end of the rod.

8. The method of claim 7 further comprising locking a cover plate over the head or nut.

9. The method of claim 5 wherein engaging the final tightening element to expand the scissor frame further comprises using a cam mechanism to push against the rod to further separate the proximal support arch from the distal support arch.

10. The method of claim 9 further comprising locking a cam handle over a portion of the cam mechanism.

* * * * *